(12) United States Patent
Takata et al.

(10) Patent No.: US 10,962,048 B2
(45) Date of Patent: Mar. 30, 2021

(54) HALF BEARING

(71) Applicant: TAIHO KOGYO CO., LTD., Toyota (JP)

(72) Inventors: Hiroki Takata, Toyota (JP); Yuichiro Kajiki, Toyota (JP)

(73) Assignee: TAIHO KOGYO CO., LTD.

(*) Notice: Subject to any disclaimer, the term of this patent is extended or adjusted under 35 U.S.C. 154(b) by 0 days.

(21) Appl. No.: 16/344,314

(22) PCT Filed: Oct. 31, 2017

(86) PCT No.: PCT/JP2017/039357
§ 371 (c)(1),
(2) Date: Apr. 23, 2019

(87) PCT Pub. No.: WO2018/079839
PCT Pub. Date: May 3, 2018

(65) Prior Publication Data
US 2019/0271355 A1     Sep. 5, 2019

(30) Foreign Application Priority Data

Oct. 31, 2016 (JP) .............................. JP2016-213389

(51) Int. Cl.
*F16C 33/10* (2006.01)
*F16C 9/02* (2006.01)
(Continued)

(52) U.S. Cl.
CPC .................. *F16C 9/02* (2013.01); *F16C 9/04* (2013.01); *F16C 17/02* (2013.01); *F16C 33/10* (2013.01); *F16C 33/1065* (2013.01)

(58) Field of Classification Search
CPC ........ F16C 33/10; F16C 33/1065; F16C 9/02; F16C 9/04; F16C 17/02
See application file for complete search history.

(56) References Cited

U.S. PATENT DOCUMENTS

| | | | |
|---|---|---|---|
| 7,234,870 B2 | 6/2007 | Kitahara et al. | |
| 9,879,725 B2* | 1/2018 | Ashihara | F16C 17/022 |

(Continued)

FOREIGN PATENT DOCUMENTS

| | | | |
|---|---|---|---|
| JP | S55-135223 A | 10/1980 | |
| JP | 2005249024 A | 9/2005 | |

(Continued)

OTHER PUBLICATIONS

Japanese Office Action for Application No. 2016-213389 dated Dec. 10, 2019 with English translation (8 pages).

(Continued)

*Primary Examiner* — Alan B Waits
(74) *Attorney, Agent, or Firm* — Harness, Dickey & Pierce, P.L.C.

(57) ABSTRACT

A half bearing includes circumferentially extending first and second grooves on the inner circumferential surface. The circumferential end of the first groove, on the rotational upstream side of the shaft, has an inclination angle θ1 of 135° formed by: a first imaginary line connecting the inner circumferential surface end of a mating surface and the origin of an outer circumferential surface; and a second imaginary line connecting the end of the first groove and the origin of the outer circumferential surface. The circumferential end of the second groove, on the rotational upstream side of the shaft, has an inclination angle θ2 of 135° formed by: a first imaginary line connecting the inner circumferential surface end of the mating surface and the origin of the inner circumferential surface; and a third imaginary line connecting the end of the second groove and the origin of the outer circumferential surface.

8 Claims, 3 Drawing Sheets

(51) Int. Cl.
F16C 17/02 (2006.01)
F16C 9/04 (2006.01)

(56) References Cited

U.S. PATENT DOCUMENTS

| | | | |
|---|---|---|---|
| 9,933,007 B2* | 4/2018 | Ashihara | F16C 33/1065 |
| 9,958,007 B2* | 5/2018 | Ashihara | F16C 17/022 |
| 9,964,140 B2 | 5/2018 | Ashihara et al. | |
| 10,054,153 B2* | 8/2018 | Seki | F16C 17/02 |
| 2004/0062458 A1* | 4/2004 | Mian | F16C 9/02 |
| | | | 384/294 |
| 2005/0196084 A1* | 9/2005 | Kitahara | F16C 9/02 |
| | | | 384/288 |
| 2016/0195127 A1* | 7/2016 | Ashihara | F16C 9/02 |
| | | | 384/288 |
| 2016/0273577 A1 | 9/2016 | Ashihara et al. | |
| 2018/0031030 A1 | 2/2018 | Sekil et al. | |

FOREIGN PATENT DOCUMENTS

| | | |
|---|---|---|
| JP | 2007-285456 A | 11/2007 |
| JP | 2015094428 A | 5/2015 |
| JP | 2016033414 A | 3/2016 |
| WO | WO-2012158749 A1 | 11/2012 |
| WO | WO-2016136997 A1 | 9/2016 |

OTHER PUBLICATIONS

Office Action for Japanese Patent Application No. 2016-213389 dated Jul. 7, 2020 (9 pages).

* cited by examiner

HALF BEARING

CROSS-REFERENCE TO RELATED APPLICATIONS

This application is a U.S. National Stage Application of International Application No. PCT/JP2017/039357, filed on Oct. 31, 2017, which claims priority to Japanese Application No. 2016-213389, filed on Oct. 31, 2016. The entire disclosures of the above applications are incorporated herein by reference.

TECHNICAL FIELD

The present invention relates to technology for reducing the amount of lubricating oil that leaks from a half bearing.

RELATED ART

In an internal-combustion engine, sliding bearings, which are a pair of semi-cylindrical bearings (called "half bearings") abutting against each other, are used to support a crankshaft (main shaft) or a connecting rod shaft so as to be rotatable. In such bearings, lubricating oil is supplied to a gap between a shaft and the bearings, an oil film is formed and the shaft moves away from the bearings as a result of the shaft rotating, and the shaft is supported by the oil film so as to rotate.

Lubricating oil leaks from the bearings, and various inventions have been made to prevent lubricating oil from leaking. For example, JP 2015-94428A 1 discloses a lower half bearing that has a groove extending along a circumferential direction of the inner circumferential surface, formed on the downstream side in the rotational direction of the shaft, in an end portion in the axial direction.

JP 2015-94428A discloses a half bearing having a groove on the inner circumferential surface, on the downstream side in the rotational direction of the shaft, with respect to a central position in the circumferential direction. However, there is room for improvement regarding positioning the ends of the groove, in order to prevent lubricating oil from leaking.

The present invention aims to reduce the amount of leaked lubricating oil, using a half bearing that has a groove on the inner circumferential surface.

SUMMARY

The present invention provides a half bearing that has a semi-cylindrical shape with an inner circumferential surface along which a shaft slides, the half bearing including: a groove that is provided on the inner circumferential surface and extends along a circumferential direction of the inner circumferential surface. An angle formed by: a line that connects an end on the inner circumferential surface of a mating surface that is located on a downstream side in a rotational direction of the shaft, and a central axis of the outer circumferential surface; and a line that connects an end of the groove in the circumferential direction, on an upstream side in the rotational direction of the shaft, and the central axis of the outer circumferential surface, is within the range of 135° to 173°.

The present invention may have a configuration in which the groove is provided as a pair of grooves.

Also, the present invention may have a configuration that further includes a crush relief formed on the inner circumferential surface, and in which the groove is formed at a position that is away from the crush relief and that is on an edge side relative to a central position of the inner circumferential surface in an axial direction, and a recessed portion that is more shallow than the groove is formed adjacent to an edge side of the groove in the axial direction.

Also, the present invention may have a configuration in which the recessed portion is open in an end surface of the half bearing located in the axial direction.

Also, the present invention may have a configuration in which an overlay layer is formed on the inner circumferential surface.

Also, the present invention may have a configuration in which the groove is located further in an edge side relative to an intermediate position between a central position in an axial direction and an edge of the inner circumferential surface.

Also, the present invention may have a configuration in which the width of the groove in an axial direction of the inner circumferential surface is no greater than twice a width from the groove to an edge that is close to the groove in the axial direction.

Advantageous Effects of Invention

According to the present invention, it is possible to reduce the amount of leaked lubricating oil, using a half bearing that has a groove on the inner circumferential surface.

DETAILED DESCRIPTION

Figure 1:
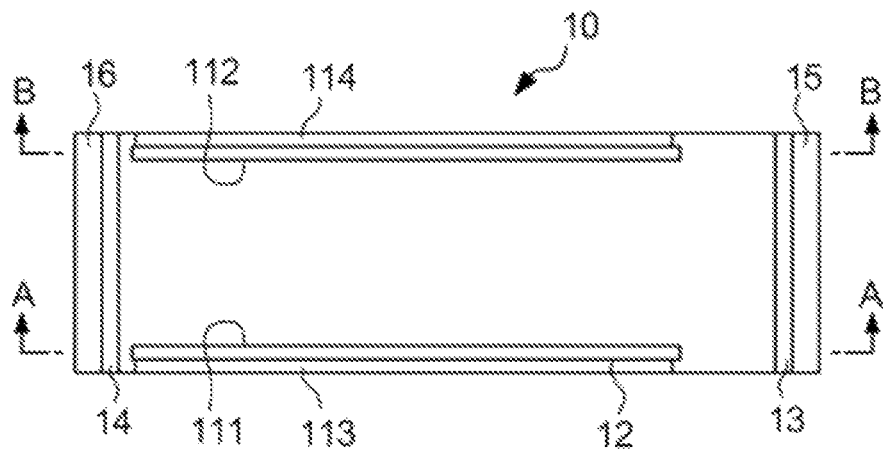
FIG. 1 is a plan view of half bearing 10 according to an embodiment of the present invention.
Figure 2:
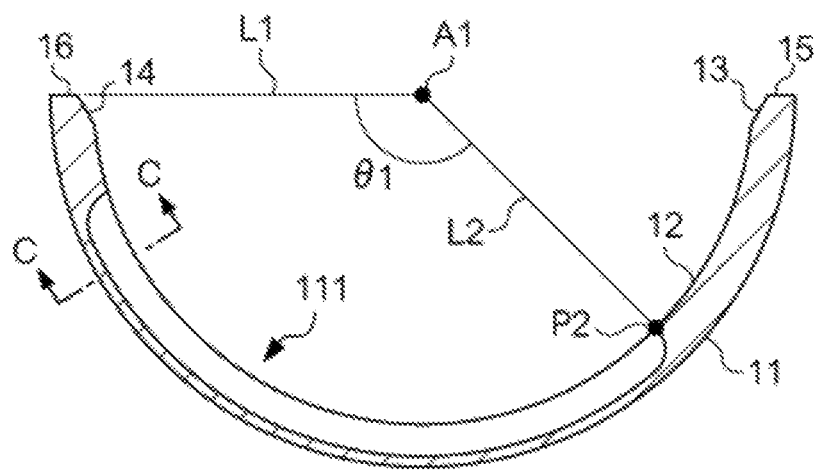
FIG. 2 is a cross-sectional view taken along line A-A in FIG. 1.
Figure 3:
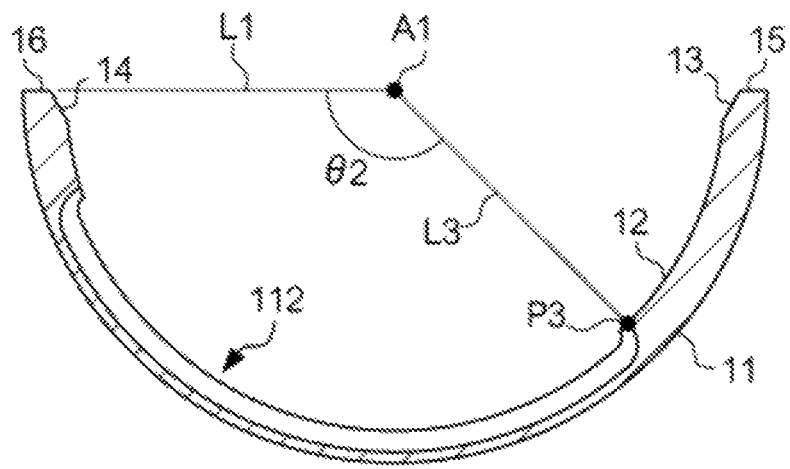
FIG. 3 is a cross-sectional view taken along line B-B in FIG. 1.

The following describes half bearing 10 according to an embodiment of the present invention with reference to the drawings. FIG. 1 is a plan view of half bearing 10 according to an embodiment of the present invention, and FIG. 2 is a cross-sectional view taken along line A-A in FIG. 1. FIG. 3 is a cross-sectional view taken along line B-B in FIG. 1. In the drawings, half bearing 10 is illustrated using a polar coordinate system in which the center (the central axis) of the outer circumferential surface of half bearing 10 is defined as the origin, and a line that connects an end of the mating surface of half bearing 10 on the inner circumferential surface with the origin is defined as a starting line, and the central axis of a shaft that is supported by the sliding bearing (the axis of the inner circumferential surface) is defined as the z axis. In the coordinate system, a direction in which the z component increases, which is the direction from the front side to the back side of the sheet of FIG. 2, is defined as a +z direction, and the opposite direction in which the z component decreases is defined as a −z direction.

Half bearing 10 has a semi-cylindrical shape, and is to be positioned so as to face upper half bearing 20 described below, which is the pair of half bearing 10. Thus, a cylindrical sliding bearing is formed, which supports a shaft so as to be rotatable. That is, half bearing 10 is the lower half bearing of the sliding bearing. Half bearing 10 is an example of a half bearing according to the present invention. Note that the shaft is supported by half bearing 10 so as to extend in the z axis direction, and rotates clockwise in FIG. 2. In the present embodiment, diameter φ of the supported shaft is in the range of 30 mm to 150 mm, for example, and the sliding bearing has an inner diameter that matches the diameter of the shaft that is to be supported.

Half bearing 10 has outer circumferential surface 11 that is an outer surface of the semi-cylindrical shape, and inner circumferential surface 12 that supports the shaft. Half bearing 10 has a three-layer structure with a back plate, a lining layer, and an overlay layer stacked in a direction from outer circumferential surface 11 to inner circumferential surface 12. The back plate is a layer for reinforcing the mechanical strength of the lining layer. The back plate is formed of steel, for example.

The lining layer is a layer for providing bearing properties such as a frictional property, seizing resistance, wear resistance, conformability, a foreign matter embedding property (robustness against foreign matter), and corrosion resistance. The lining layer is formed of a bearing alloy. In order to prevent the lining layer from adhering to the shaft, a material type that is the same as that of the shaft is avoided, and a material type different from that of the shaft is used. For example, if half bearing 10 is used as a bearing for a shaft formed of steel, an aluminum alloy is used as the bearing alloy. Note that other than an aluminum alloy, an alloy that uses a metal other than aluminum as a base, such as a copper alloy, may be used.

The overlay layer is a layer that constitutes the inner circumferential surface of the shaft, and is a layer for improving the properties of the lining layer, such as a coefficient of friction, conformability, corrosion resistance, and a foreign matter embedding property (robustness against foreign matter). The overlay layer includes at least a binder resin, for example. A heat-curable resin is used as the binder resin, for example. Specifically, the binder resin includes at least one of a polyamide imide (PAI) resin, a polyimide (PI) resin, a polyamide resin, a phenol resin, a polyacetal resin, a polyether ether ketone resin, and a polyphenylene sulfide resin. The overlay layer may further include a solid lubricating material. The solid lubricating material is added in order to improve the friction property. For example, the solid lubricating material includes at least one of $MoS_2$, $WS_2$, polytetrafluoroethylene (PTFE), graphite, h-BN, and $SB_2O_3$. For example, $MoS_2$ provides a preferable lubricity. Also, since PTFE has a low intra-molecular cohesive force, it has an effect of reducing the frictional coefficient. Furthermore, graphite improves the wettability and improves the initial conformability. Initial conformability is a property by which the sliding surface wears, becomes smooth, and causes the sliding property to improve when coming into sliding contact with a counterpart member after the start of sliding. If the sliding property improves due to the expression of the initial conformability, the overall amount of wear of the sliding layer will decrease. In the present embodiment, half bearing 10 includes an overlay layer. However, half bearing 10 may not include the overlay layer, and may have a two-layer structure with the back plate and the lining layer.

Half bearing 10 has crush relief 13, crush relief 14, mating surface 15, mating surface 16, groove 111, groove 112, recessed portion 113, and recessed portion 114. Mating surface 15 is a surface that is to abut against the upper half bearing, and is a mating surface on the upstream side in the rotational direction of the shaft. Mating surface 15 defines a first end of the half bearing 10. Mating surface 16 is a surface that is to abut against the upper half bearing, and is a mating surface on the downstream side in the rotational direction of the shaft. Mating surface 16 defines a second end of the half bearing 10. The crush reliefs are wide reliefs that are provided on the inner surface side of half bearing 10 so as to be in contact with the mating surfaces, over the entire width of half bearing 10 in the z axis direction. The crush reliefs are used to attach the bearing to the housing, and if portions of inner circumferential surface 12 near the mating surfaces are pushed toward the shaft, the crush reliefs prevent contact with the shaft. Also, the crush reliefs have an effect of cooling the bearing by allowing the lubricating oil that has fulfilled the lubricating effect to be discharged near the mating surfaces, and an effect of discharging foreign matter that has entered the inner circumferential surface 12 side. Crush relief 13 is a crush relief that is in contact with mating surface 15 and is located on the upstream side in the rotational direction of the shaft. Crush relief 14 is a crush relief that is in contact with mating surface 16 and is located on the downstream side in the rotational direction of the shaft.

Groove 111 and groove 112 are grooves provided in inner circumferential surface 12. In the present embodiment, only two grooves, namely groove 111 and groove 112, are provided on the inner circumferential surface. Groove 111 and groove 112 are grooves that extend along the circumferential direction of inner circumferential surface 12, and have the function of returning the lubricating oil flowing in the rotational direction of the shaft as a result of the shaft rotating, in the direction opposite the rotational direction of the shaft. Groove 111 is formed in the z direction of a central portion of half bearing 10 in the z axis direction, and groove 112 is formed in the +z direction of the central portion of half bearing 10 in the z axis direction. Specifically, in the z axis direction, groove 111 is located further in the −z axis direction of an intermediate position between the central position in the z axis direction and the first edge located in the −z axis direction, and groove 112 is located further in the +z axis direction of the intermediate position between the central position in the z axis direction and the second edge located in the +z axis direction.

Recessed portion 113 and recessed portion 114 are recessed portions in inner circumferential surface 12. The edge of groove 111 in the −z direction has a reduced thickness in a radial direction as a result of a cutting process, and thus recessed portion 113 that is recessed in inner circumferential surface 12 is formed. The edge of groove 112 in the +z direction has a reduced thickness in a radial direction as a result of a cutting process, and thus recessed portion 114 that is recessed in inner circumferential surface 12 is formed.

Groove 111 and recessed portion 113 are formed by applying a cutting process to inner circumferential surface 12 using a step-shaped cutter, and groove 112 and recessed portion 114 are similarly formed by applying a cutting process to inner circumferential surface 12 using a step-shaped cutter. The depth of a flat portion at the bottom of groove 111 is uniform in the circumferential direction, and the depth of a flat portion at the bottom of groove 112 is also uniform in the circumferential direction. The depth of a flat portion of recessed portion 113 is uniform in the circumferential direction, and the depth of a flat portion at the bottom of recessed portion 114 is also uniform in the circumferential direction. The inner surface side of half bearing 10 is subjected to a cutting process, and thus groove 111, groove 112, recessed portion 113, and recessed portion 114 are formed. Thereafter, the overlay layer is formed on inner circumferential surface 12 through pad printing. Thus, the overlay layer is not present on groove 111, groove 112, recessed portion 113, and recessed portion 114, and the lining layer is exposed therefrom. In the present embodiment, the depth of the grooves and the recessed portions is uniform in the circumferential direction, but may be non-uniform.

Next, regarding the position of groove 111 seen in the circumferential direction of inner circumferential surface 12, as shown in FIG. 2, the end of groove 111 on the downstream side in the rotational direction of the shaft (the end on the crush relief 14 side), of the ends of groove 111 in the circumferential direction, is located at a distance from crush relief 14 so as not to reach crush relief 14. Specifically, the distance from crush relief 14 to the end of groove 111 on the crush relief 14 side is shorter than the length of groove 111 in the circumferential direction. Also, when imaginary line L1 that connects the inner surface side end of mating surface 15 with origin A1 of outer circumferential surface 11 is defined as the starting line of the polar coordinate system, the end of groove 111 on the upstream side in the rotational direction of the shaft (the end on the crush relief 13 side), of the ends of groove 111 in the circumferential direction, is located at the position (the position of point P2) where line L2 drawn from origin A1 at inclination angle θ1 intersects inner circumferential surface 12. In the present embodiment, inclination angle θ1 is 135°.

Next, regarding the position of groove 112 seen in the circumferential direction of inner circumferential surface 12, as shown in FIG. 3, the end of groove 112 on the downstream side in the rotational direction of the shaft (the end on the crush relief 14 side), of the ends of groove 112 in the circumferential direction, is located at a distance from crush relief 14 so as not to reach crush relief 14. Specifically, the distance from crush relief 14 to the end of groove 112 on the crush relief 14 side is shorter than the length of groove 112 in the circumferential direction. Also, when imaginary line L1 that connects the inner surface side end of mating surface 15 with origin A1 of outer circumferential surface 11 is defined as the starting line of the polar coordinate system, the end of groove 112 on the upstream side in the rotational direction of the shaft (the end on the crush relief 13 side), of the ends of groove 112 in the circumferential direction, is located at the position (the position of point P3) where line L3 drawn from origin A1 at inclination angle θ2 intersects inner circumferential surface 12. In the present embodiment, inclination angle θ2 is 135°.

In half bearing 10, a position at which an oil film has its minimum thickness may be located within the range where inclination angle θ1 and an inclination angle θ2 are greater than 135°, depending on the type of lubricating oil. Therefore, in the present embodiment, inclination angle θ1 and inclination angle θ2 are set to 135° so that the position at which an oil film has its minimum thickness is not present on groove 111 or groove 112.

Figure 4:
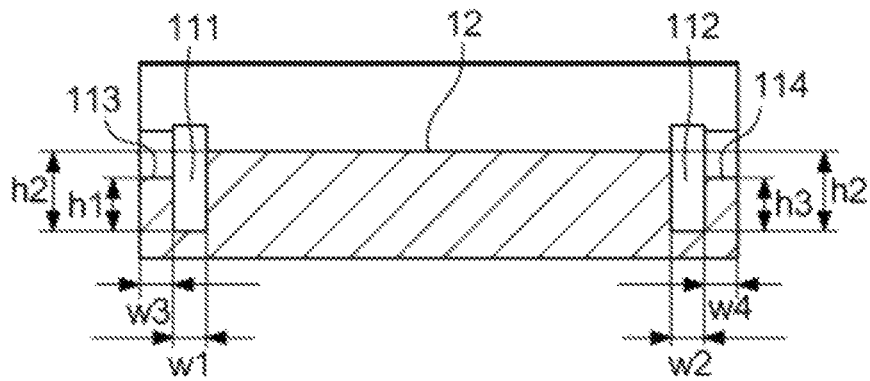
FIG. 4 is a cross-sectional view taken along line C-C in FIG. 2.

FIG. 4 is a cross-sectional view taken along line C-C in FIG. 2. In FIG. 4, in order to prevent the drawing from becoming complex, the back plate, the lining layer, and the overlay layer are not distinguished from each other. In the present embodiment, the wall thickness of half bearing 10 is not uniform, and the wall thickness increases in a direction toward a central portion in the left-right direction in FIG. 1, and decreases in directions from the central portion to the end portions (the mating surfaces). This is because a finished inner diameter circle (a circle drawn by inner circumferential surface 12) is decentered (shifted) outward from the center of an outer diameter circle (circle drawn by outer circumferential surface 11). A so-called oil relief is formed due to this decentering. An oil relief refers to a gap between the finished inner diameter circle and a reference inner diameter circle that has a shorter radius than the outer diameter circle and has the same origin as the outer diameter circle. The depth (amount) of the oil relief is measured using a certain height (e.g., 6 to 13 mm) from the mating surface as a reference, and is 0.005 to 0.025 mm for example. The oil relief expands the oil clearance near the mating surfaces and assists in the formation of wedge film pressure. Moreover, the oil relief assists in the formation of an oil film, increases the amount of oil, and cools the bearing.

As shown in FIG. 4, height h1 from the bottom of groove 111 to the bottom of recessed portion 113 on the edge side in the −z direction relative to groove 111 is smaller than height h2 from the bottom of groove 111 to inner circumferential surface 12 on the central side relative to groove 111. Also, as shown in the drawing, height h3 from the bottom of groove 112 to the bottom of recessed portion 114 on the edge side in the +z direction relative to groove 112 is smaller than height h2 from the bottom of groove 112 to inner circumferential surface 12 on the central side relative to groove 112. In the present embodiment, height h1=height h3 is satisfied.

In the present embodiment, recessed portion 113 and recessed portion 114 are open in the side surface of the half bearing in the axial direction. Thus, it is possible to improve the effect of sucking back the lubricating oil that leaks from, or is about to leak from, the inner circumferential surface of the half bearing, and returning it to the half bearing.

Also, in the present embodiment, width w1 of groove 111 in the z axis direction is the same as width w3 of recessed portion 113 in the z axis direction, the width of groove 112 in the z axis direction is the same as width w3 of recessed portion 114 in the z axis direction, and width w1=width w2 is satisfied. Note that width w1 is preferably no greater than twice width w3, and width w2 is preferably no greater than twice width w4.

In the present embodiment, width w1 and width w2 are 1 mm. Also, in the present embodiment, height h1 and height h3 are 1 mm, and height h2 is 1.5 mm. Note that width w1, width w2, and heights h1 to h3 are not limited to the aforementioned dimensions, and other dimensions may be employed. For example, width w1 and width w2 may be smaller than 1 mm or greater than 1 mm. Also, height h1 and height h3 may be smaller than 1 mm or greater than 1 mm. Also, height h2 may be smaller than 1.5 mm or greater than 1.5 mm.

Figure 5:
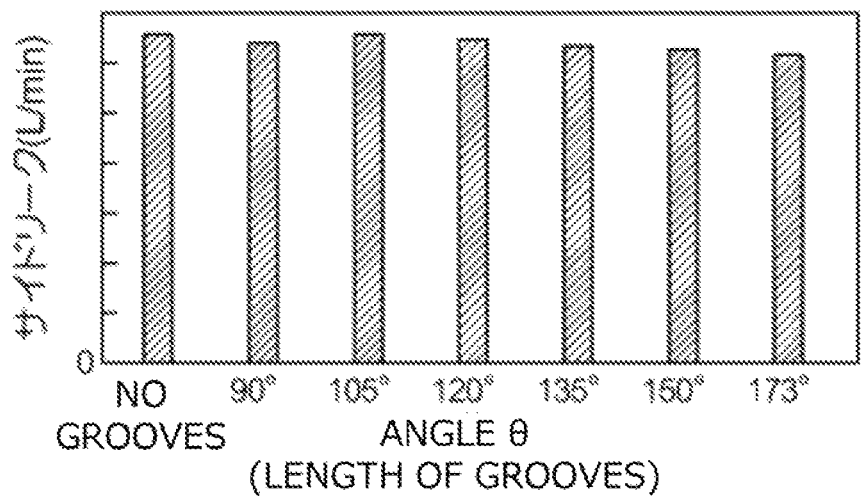
FIG. 5 shows an example of the results of analysis of the amount of leaked lubricating oil.

FIG. 5 is a graph showing the results of analysis regarding the amount of leaked lubricating oil (side leak) when a sliding bearing in which groove 111 and groove 112 do not reach crush relief 14, is used as a bearing that supports a crankshaft of an engine, and the engine is rotated by igniting the fuel supplied to the engine. As shown in FIG. 5, when inclination angle θ is 135° as in the embodiment, the amount of leaked lubricating oil is smaller than when inclination angle θ is 90°. Thus, the amount of leaked lubricating oil is reduced.

Also, if groove 111 and groove 112 reach crush relief 14, the minimum thickness of the oil film is small. In contrast, according to the present embodiment, groove 111 and groove 112 do not reach crush relief 14. Therefore, the minimum thickness of the oil film is large, and the load capacity is prevented from decreasing.

Figure 6:
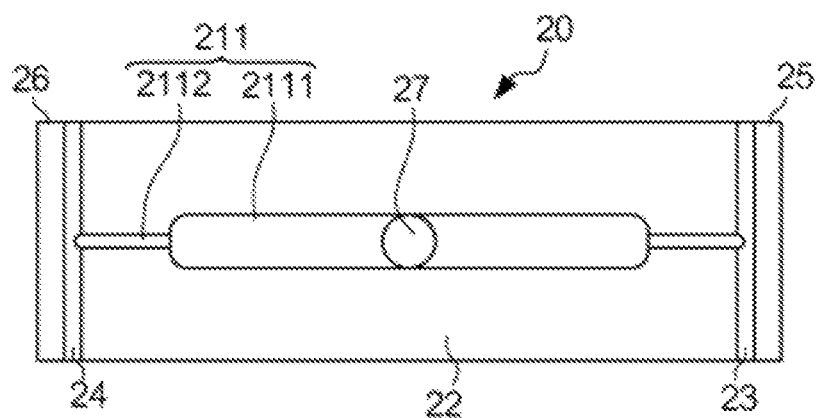
FIG. 6 shows half bearing 20 seen from the half bearing 10 side.

FIG. 6 is a diagram showing upper half bearing 20, which is the pair of half bearing 10, seen from the half bearing 10 side. The wall thickness of half bearing 20 is also not uniform as with half bearing 10. The wall thickness increases in a direction toward a central portion, and decreases in directions from the central portion to the end portions (mating surfaces), and an oil relief is formed.

Half bearing 20 has crush relief 23, crush relief 24, mating surface 25, mating surface 26, hole 27, and groove 211. Hole 27 is a through hole penetrating from the outer circumferential surface to the inner circumferential surface of half bearing 20. Lubricating oil that is supplied to the outer circumferential surface of half bearing 20 is supplied to the inner circumferential surface 22 side via hole 27. Mating surface 15 is a surface that is to abut against mating surface 15, and mating surface 26 is a surface that is to abut against mating surface 16. Crush relief 13 is a crush relief that is in contact with mating surface 25, and crush relief 24 is crush relief that is in contact with mating surface 16.

Groove 211 is formed over the entire length of half bearing 20 in the circumferential direction, from mating surface 25 to mating surface 26. The width of groove 211 (the length of the groove in the axial direction when viewing half bearing 20 from a direction orthogonal to the mating surfaces; hereinafter referred to as "groove width") is not uniform, but the groove 211 is relatively thin (narrow) in the crush reliefs and relatively thick (wide) at portions other than the crush reliefs. Hereinafter, a relatively thick portion of groove 211 will be referred to as thick groove 2111, and a relatively thin portion of groove 211 will be referred to as thin groove 2112. Thick groove 2111 and thin groove 2112 are both configured to be thicker (wider) than groove 111, and thicker (wider) than groove 112. The groove width does not continuously (i.e. gradually) change from thick groove 2111 to thin groove 2112, but decreases rapidly. Note that the groove width of groove 2111 is uniform except for the vicinity of the border with thin groove 2112, and the groove width of thin groove 2112 is uniform. Note that the groove width being uniform means that variation in the groove width is within a certain range, and for example, is 1/10 or less of the groove width, and preferably 1/100 or less of the groove width.

Also, the depth of groove 211 is not uniform, but is relatively small in the crush relief and relatively large at portions other than the crush relief. In other words, thick groove 2111 is relatively deep, and thin groove 2112 is relatively shallow. The groove width does not continuously (i.e. gradually) change from thick groove 2111 to thin groove 2112, but decreases rapidly. Note that the depth of thick groove 2111 is uniform and the depth of thin groove 2112 is uniform. Note that the depth being uniform means that variation in the depth is within a certain range, and for example, is 1/10 or less of the depth of the groove, and preferably 1/100 or less of the depth of the groove. However, strictly speaking, there are cases where half bearing 20 is manufactured such that the thickness thereof from the bottom of the groove to the outer circumferential surface is uniform, and in such a case, the thickness of the groove fluctuates by an amount corresponding to the oil relief and the crush relief.

For example, the groove width of thick groove 2111 is 2 mm to 5 mm, and the depth of thick groove 2111 is smaller than the groove width, and is 0.5 mm to 1.5 mm, for example. The groove width of thin groove 2112 is more narrow than the groove width of the thick groove, and the depth of narrow groove 2112 is more shallow than the depth of the thick groove.

Thus, due to groove 211 being relatively thick and deep at the portion other than the crush reliefs, it is possible to sufficiently ensure the volume of groove 211, or in other words, to sufficiently ensure the amount of lubricating oil to be supplied to the sliding surface. Moreover, due to the groove being relatively thin and shallow at the portions in the crush reliefs, it is possible to reduce the amount of oil that leaks from mating surface 25 and mating surface 26 in comparison to the case where the width and depth of the groove are uniform.

Modification

Although an embodiment of the present invention has been described above, the present invention is not limited to the above-described embodiment, and may be carried out in other various modes. For example, the above-described embodiment may be modified as follows and the present invention may be carried out as such. Note that the above-described embodiment and the following modifications may be combined with each other.

Regarding groove 111 and groove 112, the positions of the crush relief 14 side ends (the positions of the ends on the downstream side in the rotational direction of the shaft) are not limited to those shown in the drawings, and may be other positions, provided that the grooves do not overlap the crush relief 14. For example, the ends of groove 111 and groove 112 on the crush relief 14 side may be located on the right side of the central portion in the left-right direction in FIG. 1. Also, in a configuration in which half bearing 10 is not provided with a crush relief, it is preferable that the ends of groove 111 and groove 112 on the downstream side in the rotational direction of the shaft do not overlap mating surface 16.

Although inclination angles θ1 and θ2 are 135° in the above-described embodiment, inclination angles θ1 and θ2 are not limited to 135°, and may be other angles. As shown in FIG. 5, the amount of leaked lubricating oil is smaller when inclination angle θ is in the range of 135° to 173° than when inclination angle θ is 90°. Therefore, it is preferable that the position where the thickness of the oil film is at its minimum is avoided, and inclination angles θ1 and θ2 are within the range of 135° to 173°.

Although half bearing 10 has a configuration in which both groove 111 and groove 112 are provided in the above-described embodiment, half bearing 10 may have a configuration in which one of groove 111 and groove 112 is not provided.

Although half bearing 10 is provided with recessed portion 113 and recessed portion 114 in the above-described embodiment, half bearing 10 may have a configuration in which recessed portion 113 and recessed portion 114 are not provided.

The present invention may have a configuration in which the above-described overlay layer is also provided on groove 111, groove 112, recessed portion 113, and recessed portion 114. Alternatively, it is possible to employ a configuration in which the above-described overlay layer is provided on recessed portion 113 and recessed portion 114, but is not provided on the bottom of groove 111 or groove 112.

In the above-described embodiment, in the z axis direction, groove 111 is located further in the −z axis direction of an intermediate position between the central position in the z axis direction and the edge located in the −z axis direction, and, in the z axis direction, groove 112 is located further in the +z axis direction of the intermediate position between the central position in the z axis direction and the edge located in the +z axis direction. However, the positions of groove 111 and groove 112 in the z axis direction are not limited to those in the embodiment, and may be other positions. For example, it is possible to employ a configuration in which, in the z axis direction, groove 111 is located in the +z direction of an intermediate position between the central position in the z axis direction and the edge located in the −z axis direction, and, in the z axis direction, groove 112 is located in the −z direction of the intermediate position between the central position in the z axis direction and the edge located in the +z axis direction.

Although the depth from inner circumferential surface 12 to the bottom of groove 111 and the depth from inner circumferential surface 12 to the bottom of groove 112 are the same in the above-described embodiment, they may be different from each other.

Although the bottoms of groove 111 and groove 112 are flat as shown in FIG. 4 in the above-described embodiment, the bottoms of groove 111 and groove 112 are not limited to being flat. For example, the bottoms of groove 111 and groove 112 may be semi-circular. Also, central portions and edges of the bottoms of groove 111 and groove 112 in the z axis direction may be rounded.

The invention claimed is:

1. A half bearing comprising:
   a semi-cylindrical bearing body that has an inner circumferential surface along which a shaft slides, the inner circumferential surface being bordered by:
      a first edge and a second edge that extend in a circumferential direction of the inner circumferential surface; and
      a first end and a second end that extend in an axial direction of the inner circumferential surface, the first end being located on an upstream side of a rotational direction of the shaft, the second end being located on a downstream side of the rotational direction of the shaft;
   a first groove that is provided in the inner circumferential surface, the first groove extending along the circumferential direction of the inner circumferential surface,
   a second groove that is provided in the inner circumferential surface, the second groove extending along the circumferential direction of the inner circumferential surface,
   wherein the first groove is formed nearer to the first edge in an axial direction than a central position of the inner circumferential surface,
   the second groove is formed nearer to the second edge in an axial direction than the central position of the inner circumferential surface,
   the first groove has an inner circumferential end distal from the second end, the inner circumferential end of the first groove is located in a first area of the inner circumferential surface, the first area being defined by (i) the first edge, (ii) a first intermediate position of the inner circumferential surface, (iii) a 135° line, and (iv) a 173° line, the intermediate position being between the first edge and the central position of the inner circumferential surface in the axial direction, the 135° line being a line that connects the inner circumferential end of the first groove and a central axis of the outer circumferential surface at a 135° angle from a reference line that connects the second end and the central axis, the 173° line being a line that connects the inner circumferential end of the first groove and the central axis at a 173° angle from the reference line;
   the second groove has an inner circumferential end distal from the second end,
   the inner circumferential end of the second groove is located in a second area of the inner circumferential surface, the second area being defined by (i) the second edge, (ii) a second intermediate position of the inner circumferential surface, (iii) the 135° line, and (iv) the 173° line, the second intermediate position being between the second edge and the central position of the inner circumferential surface in the axial direction.

2. The half bearing according to claim 1, further comprising:
   a crush relief formed in the inner circumferential surface;
   a first recessed portion formed adjacent to the first edge and the first groove in the axial direction, the first recessed portion being more shallow than the first groove; and
   a second recessed portion formed adjacent to the second edge and the second groove in the axial direction, the second recessed portion being more shallow than the second groove,
   wherein the first groove is circumferentially spaced apart from the crush relief, and
   the second groove is circumferentially spaced apart from the crush relief.

3. The half bearing according to claim 2,
   wherein an overlay layer is formed on the inner circumferential surface.

4. The half bearing according to claim 2,
   wherein the first recessed portion is open along the first edge of the inner circumferential surface in the axial direction, and
   the second recessed portion is open along the second edge of the inner circumferential surface in the axial direction.

5. The half bearing according to claim 4,
   wherein an overlay layer is formed on the inner circumferential surface.

6. The half bearing according to claim 1,
   wherein an overlay layer is formed on the inner circumferential surface.

7. The half bearing according to claim 1,
   wherein the first groove is located closer to the first edge than to the first intermediate position, and
   the second groove is located closer to the second edge than to the second intermediate position.

8. The half bearing according to claim 1,
   wherein a widest width of the first groove in the axial direction of the inner circumferential surface is no greater than twice a width from the first groove to the first edge in the axial direction, and
   wherein a widest width of the second groove in the axial direction of the inner circumferential surface is no greater than twice a width from the second groove to the second edge in the axial direction.

* * * * *